May 14, 1940.  M. R. CLOVER  2,200,617

ANIMAL TRAP

Filed July 10, 1939  2 Sheets-Sheet 1

Inventor
Melvin R. Clover
By Lyon & Lyon
Attorneys

May 14, 1940.　　　　M. R. CLOVER　　　　2,200,617
ANIMAL TRAP
Filed July 10, 1939　　　　2 Sheets-Sheet 2
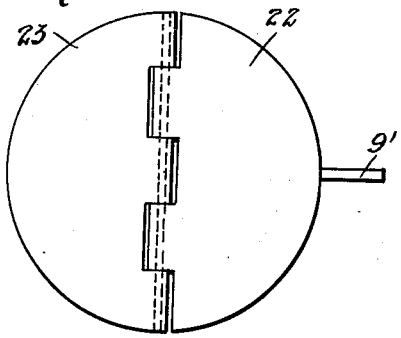
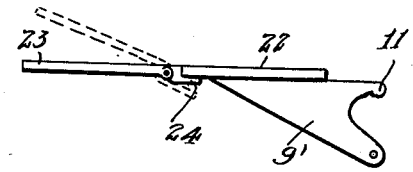
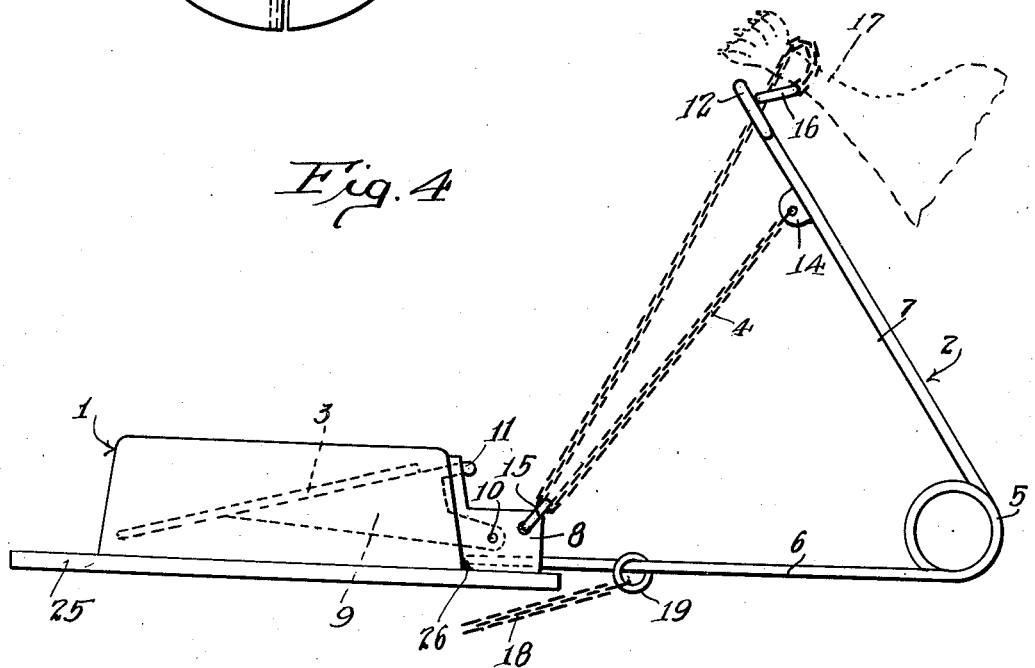
Inventor
Melvin R. Clover
By Lyon & Lyon
Attorneys Patented May 14, 1940

2,200,617

UNITED STATES PATENT OFFICE 2,200,617

ANIMAL TRAP

Melvin R. Clover, Ventura, Calif.

Application July 10, 1939, Serial No. 283,609

4 Claims. (Cl. 43—87)

This invention relates to animal traps, and has as a general object to provide a trap that will hold a trapped animal securely without maiming or torturing it.

Another object is to provide a trap of the type employing a noose, which is particularly free from fouling and is reliable in operation.

Still another object is to provide a trap that is relatively inexpensive to manufacture.

Further objects and features of the invention will be apparent from the detailed description to follow, of a particular embodiment of the invention, when read in connection with the drawings to which it refers.

This is a continuation in part of my copending application Serial No. 184,479, filed January 11, 1938, and entitled Animal trap.

In the drawings:

Fig. 4 is a side elevation of the trap in sprung position;

Fig. 5 is a plan view, showing an alternative trigger plate construction; and

Fig. 6 is a side elevation of the trigger plate shown in plan in Fig. 5.

Figure 1:
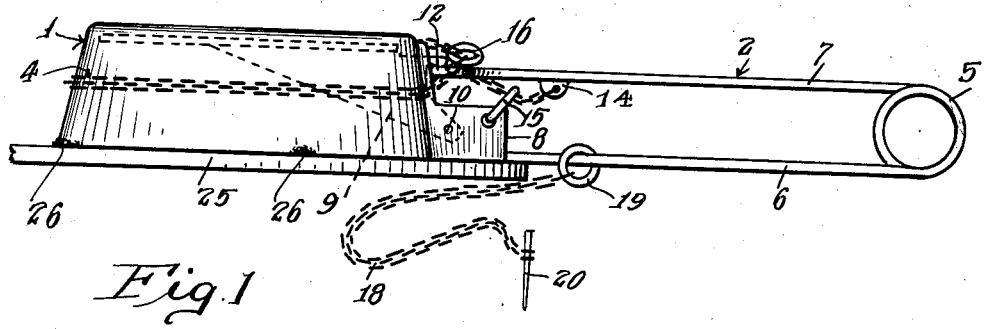
Fig. 1 is a side elevation of a trap in accordance with my invention, the trap being shown in set position.
Figure 3:
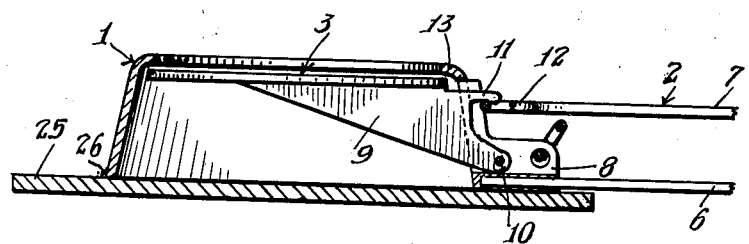
Fig. 3 is a vertical sectional view through the trigger plate and enclosing structure of the trap shown in set position.
Figure 2:
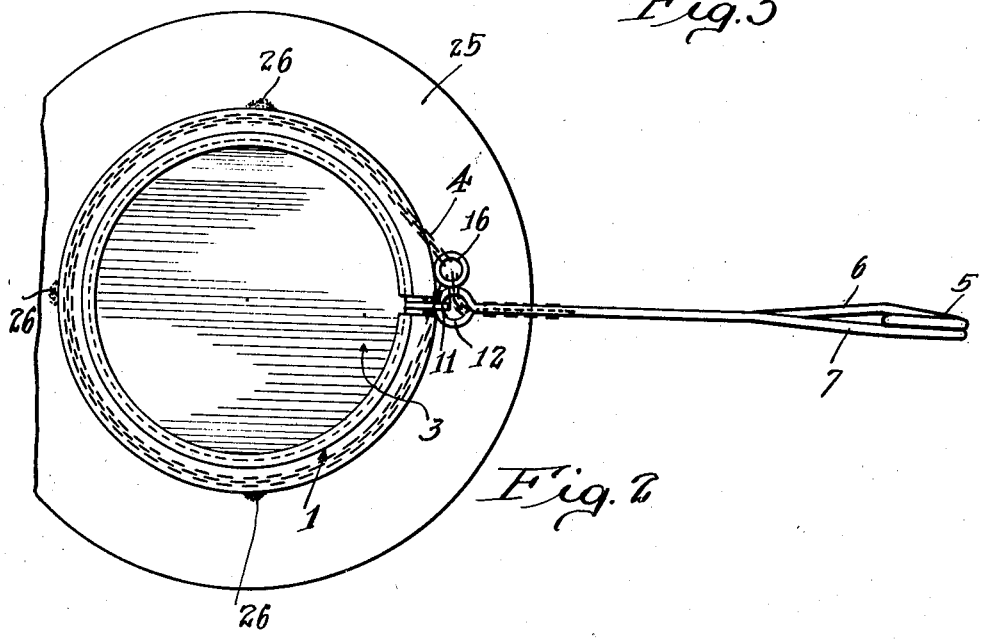
Fig. 2 is a plan view of the trap shown in set position.

Referring first to Figs. 1, 2, 3 and 4, the trap therein depicted comprises as its main elements a hollow base or frame member 1, an actuating spring 2, a trigger plate 3 and a noose element 4, which is shown as a chain in the drawings but might be any other flexible filamentary element, such as a wire, cable or cord.

The spring element 2 may be formed of spring steel wire coiled at the center, as indicated at 5, to provide additional resilience, the two ends of the wire projecting from the coil 5 constituting a lower arm 6 and an upper arm 7 which normally tend to assume positions substantially at right angles to each other. As shown in Fig. 4, the arms extend at an angle somewhat less than 90° from each other but they are restrained from assuming full release position by the chain 4. The lower arm 6 is anchored at its outer end to the hollow frame member 1. Thus the latter may be formed from a sheet metal stamping, the ends of which are bent to form a pair of juxtaposed flanges 8 between which the end of the arm 6 extends. The flanges 8 may then be secured to each other and to the arm 6 by welding.

The base 1 preferably rests upon and is attached to a flat plate 25 of substantially larger diameter. Attachment may be effected by spot welding the two parts together at various points about the periphery of the base 1, as indicated at 26. The plate 25 provides a large base, reducing the chances of the trap being overturned and also serves to close the lower end of the base 1.

When the trap is in set position, the arm 7 is forced down into substantially parallel relation to the arm 6 and releasably secured in that position by a trigger mechanism including the trigger plate 3. Thus the trigger plate 3 may be attached on its under side to a triangular plate 9 which projects beyond the plate 3 into the space between the two flanges 8. The plate 9 is mounted for swinging movement in a vertical plane by a pivot pin 10 which extends through the flanges 8. The portion of the plate 9 adjacent to and above the pivot pin 10 is cut away to define a keeper arm 11 which engages an eye or ring 12 formed in the outer end of the spring arm 7 when the latter is in lower position and the trigger plate 3 is in upper position, all as clearly shown in Fig. 3. It will be obvious from Fig. 3 that if the trigger plate 3 is depressed to swing the plate 9 about the pivot pin 10, the keeper arm 11 will release the end of the spring arm 7, permitting it to be sprung upwardly away from the base 1.

The upper edge of the base 1 is preferably bent inwardly to define an annular flange 13 of smaller internal diameter than the diameter of the trigger plate 3 so that it is impossible for an animal to pass its foot into the base member past the edge of the plate 3.

The chain 4 is permanently secured at one end to the upper spring arm 7, attachment being effected in the particular model shown by means of a bracket 14. From the bracket 14 the chain extends through a ring or eyelet 15 secured to the flanges 8 of the base member and thence through the eye 12 in the end of the upper spring arm 7. The opposite end of the chain 4 has permanently attached thereto a ring 16 which constitutes the loop through which the chain is extended to form the noose.

The trap as described is operated as follows: To set the trap the upper arm 7 is depressed into parallel relation with the lower arm 6 and secured in that position by lifting the trigger plate 3 to cause the keeper arm 11 to engage the eye 12 formed in the end of arm 7. The friction between the eye 12 and the arm 11 is sufficient to retain the plate 3 in upper position.

Next the chain is drawn through the ring 16 to form a noose therein, which noose is looped around the base 1. The chain 4 is preferably of such length that the noose fits snugly about the base 1 at a point between the upper and lower edges thereof.

Assuming that the trap is set in the runway of an animal, and that the animal steps on the trigger plate 3, the latter is depressed, displacing the keeper arm 11 out of holding relation with the eye 12, whereupon the arm 7 snaps away from the arm 6. In moving upwardly, the ring 12 carries the chain 4 with it, tending to lift the ring 16 and at the same time drawing the chain through the ring 16 in a direction to contract the noose. This latter effect results from the fact that the chain is extended through the ring 15 which is anchored to the base. (This is clearly apparent from an inspection of Figs. 1 and 4.) The upward movement of the noose and its simultaneous contraction, carries it off the sloping sides of the base 1 and tightens it about the leg of the animal, since the foot of the animal is at the time resting upon the trigger plate 3. The contracting motion of the noose continues until it is engaged firmly about the leg of the animal, as shown in Fig. 4, the leg being indicated at 17.

It will be observed from Fig. 4 that the eye 12 in the end of arm 7 bears against the ring 16 on the end of the chain 4, thereby eliminating any possibility of the noose being loosened because it maintains the chain taut at all times.

Of course if the animal pulls strongly on the noose, the chain 4 may slip through the stationary ring 15 and pull the arm 7 toward the arm 6, thereby carrying the eye 12 out of contact with the ring 16. However, this is immaterial, since the noose is inherently tightened about the leg of the animal whenever the chain 4 is in tension. The noose could only become loosened on the animal's leg if the tension were removed from the chain 4 and this is impossible with my structure because the spring arms 6 and 7 separate immediately in response to any reduction in the pull by the animal to draw the chain through the eye 12 and maintain the noose tight.

It is to be understood that although I prefer to employ the base plate 25, this plate is not absolutely essential, particularly when the length of the chain 4 is so chosen that the noose normally rests upon the sloping surface of the base member 1, as shown in Figure 1. Furthermore, when the base 25 is provided as shown, the length of the chain 4 may be so proportioned that the noose is larger than the circumference of the base 1 and the noose rests upon the plate 25 instead of on the sloping side of the base 1.

If desired, the trap may be anchored as by an anchor chain 18 secured at one end to a ring 19 on the spring arm 6 and at the other end to a pin 20.

As shown in Figs. 1, 2, 3 and 4, the trigger plate 3 is rigid and is of one piece construction.

A modified construction of trigger plate 3 is disclosed in Figs. 5 and 6, in which the plate is formed in two pieces 22 and 23, respectively, which are hinged together. Only one part 22 of the hinge is anchored to the pivot plate 9'. However, the plate 23 is provided with a lip 24 adapted to engage the underside of plate 22 and limit downward swinging movement of the plate 23 without preventing upward movement thereof. With the plate construction of Figs. 5 and 6, downward pressure on either section of the plate is applied to the plate 9' to move the latter into tripped position. However it may sometimes occur that some obstacle may be positioned below the outer portion of the trigger plate preventing downward movement thereof. Such an obstacle under the outer edge of the plate 3 of Fig. 1 might prevent downward movement of the plate 9 sufficient to trip the trap. However, with the construction of Figs. 5 and 6, an animal stepping upon either plate 22 or 23 would trip the trap even though a rock or other obstacle prevented downward movement of the outer edge of plate 23 because the plate structure would bend along the hinge connection between the two sections, permitting the section 22 and the plate 9' to be depressed sufficiently to release the trap.

Although for the purpose of explaining my invention a particular embodiment thereof has been described in detail, it is to be understood that various changes can be made in the particular structure described without departing from the invention, which is to be limited only as defined in the appended claims.

I claim:

1. An animal trap comprising a substantially flat base member having a hollow boss rising therefrom, said boss being substantially smaller laterally than said base member, a noose adapted to encircle said boss, means for contracting said noose, including a spring adapted to be set, and a trigger for releasing the spring, said trigger being positioned in said boss.

2. An animal trap comprising a filament having a first eye attached to one end thereof, said eye being slidable along an intermediate portion of the filament to form a noose, a second eye relatively slidable along said filament between the other end thereof and said first eye, means adapted to be tripped by an animal for drawing said filament through said second eye in response to tripping thereof, said first and second eyes being incapable of passing each other along said filament, whereby movement of said second eye along said filament forces said first eye therealong to contract said noose.

3. An animal trap comprising a filamentary element, a first eye secured to one end of said filament and slidable therealong to define a contractable noose, a second eye slidable on said element between said first eye and the other end of said element, means connecting said other end in fixed relation to said second eye, a third eye slidable on said element between said second eye and said other end of said element, spring means for separating said second and third eyes to draw said element through said first eye to contract said noose, and trigger means for releasably restraining said spring means.

4. An animal trap comprising a cup-like shield having one edge resting upon the ground and open at its top, an inturned flange at its open upper edge, a treadle pivoted to the shield and positioned under the flange, a trip projecting from one edge of the treadle, a resilient member formed to provide a pair of arms, a coil spring joining said arms at one end, one of said arms being secured to the shield, an eye at the free end of the other arm and adapted to engage under the trip, and a flexible member including a noose surrounding the shield and having one end anchored to one of the arms to contract the noose upon releasing of said other arm.

MELVIN R. CLOVER.